US008269736B2

(12) United States Patent
Wilairat

(10) Patent No.: US 8,269,736 B2
(45) Date of Patent: Sep. 18, 2012

(54) DROP TARGET GESTURES

(75) Inventor: Weerapan Wilairat, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 573 days.

(21) Appl. No.: 12/470,558

(22) Filed: May 22, 2009

(65) Prior Publication Data
US 2010/0295795 A1 Nov. 25, 2010

(51) Int. Cl.
G06F 3/041 (2006.01)
(52) U.S. Cl. .......................... 345/173; 345/174
(58) Field of Classification Search .......... 345/173–178; 178/18.1–18.11; 715/769, 838, 846, 977
See application file for complete search history.

(56) References Cited

U.S. PATENT DOCUMENTS

| | | | |
|---|---|---|---|
| 5,189,732 A | 2/1993 | Kondo | |
| 5,258,748 A | 11/1993 | Jones | |
| 5,463,725 A | 10/1995 | Henckel et al. | |
| 5,515,495 A | 5/1996 | Ikemoto | |
| 5,574,836 A | 11/1996 | Broemmelsiek | |
| 5,675,329 A | 10/1997 | Barker | |
| 5,905,492 A | 5/1999 | Straub et al. | |
| 5,914,720 A | 6/1999 | Maples et al. | |
| 5,963,204 A | 10/1999 | Ikeda et al. | |
| 6,008,816 A | 12/1999 | Eisler | |
| 6,396,963 B2 | 5/2002 | Shaffer | |
| 6,424,338 B1 | 7/2002 | Andersone | |
| 6,507,643 B1 | 1/2003 | Groner | |
| 6,662,023 B1 | 12/2003 | Helle | |
| 6,784,925 B1 | 8/2004 | Tomat | |
| 6,865,297 B2 | 3/2005 | Loui | |
| 6,876,312 B2 | 4/2005 | Yu | |
| 6,904,597 B2 | 6/2005 | Jin | |
| 6,961,731 B2 | 11/2005 | Holbrook | |
| 6,983,310 B2 | 1/2006 | Rouse | |
| 6,987,991 B2 | 1/2006 | Nelson | |
| 7,013,041 B2 | 3/2006 | Miyamoto | |
| 7,058,955 B2 | 6/2006 | Porkka | |

(Continued)

FOREIGN PATENT DOCUMENTS

CN 102197702 9/2011

(Continued)

OTHER PUBLICATIONS

"Alltel Adds Dedicated Search Key to Phones", Retrieved from: <http://www.phonescoop.com/news/item.php?n=2159> on Nov. 26, 2008., (Apr. 12, 2007), 2 Pages.

(Continued)

Primary Examiner — Amare Mengistu
Assistant Examiner — Premal Patel
(74) Attorney, Agent, or Firm — Wolfe-SBMC

(57) ABSTRACT

Embodiments of drop target gestures are described. In various embodiments, a first input on a touch-screen is detected and determined as a selection of an object displayed on the touch-screen. A second input on the touch-screen is detected and determined as a selection of a target position to move the object, the second input being detected while the first input remains in contact with the touch-screen. The first input is then detected as no longer being in contact with the touch-screen, and a display of the object is initiated at the target position on the touch-screen giving the appearance that the object moves from a location of the first input to the second input.

20 Claims, 7 Drawing Sheets

U.S. PATENT DOCUMENTS

| | | | |
|---|---|---|---|
| 7,065,385 B2 | 6/2006 | Jarrad et al. | |
| 7,065,386 B1 | 6/2006 | Smethers | |
| 7,111,044 B2 | 9/2006 | Lee | |
| 7,133,707 B1 | 11/2006 | Rak | |
| 7,133,859 B1 | 11/2006 | Wong | |
| 7,139,800 B2 | 11/2006 | Bellotti et al. | |
| 7,158,123 B2* | 1/2007 | Myers et al. | 345/173 |
| 7,178,111 B2 | 2/2007 | Glein et al. | |
| 7,216,588 B2 | 5/2007 | Suess | |
| 7,249,326 B2 | 7/2007 | Stoakley et al. | |
| 7,280,097 B2 | 10/2007 | Chen | |
| 7,283,620 B2 | 10/2007 | Adamczyk | |
| 7,289,806 B2 | 10/2007 | Morris et al. | |
| 7,296,184 B2 | 11/2007 | Derks et al. | |
| 7,336,263 B2 | 2/2008 | Valikangas | |
| 7,369,647 B2 | 5/2008 | Gao et al. | |
| 7,388,578 B2 | 6/2008 | Tao | |
| 7,403,191 B2 | 7/2008 | Sinclair | |
| 7,447,520 B2 | 11/2008 | Scott | |
| 7,479,949 B2 | 1/2009 | Jobs | |
| 7,480,870 B2 | 1/2009 | Anzures | |
| 7,483,418 B2 | 1/2009 | Maurer | |
| 7,496,830 B2 | 2/2009 | Rubin | |
| 7,610,563 B2 | 10/2009 | Nelson et al. | |
| 7,619,615 B1 | 11/2009 | Donoghue | |
| 7,640,518 B2 | 12/2009 | Forlines et al. | |
| 7,657,849 B2 | 2/2010 | Chaudhri et al. | |
| 7,671,756 B2 | 3/2010 | Herz et al. | |
| 7,755,674 B2 | 7/2010 | Kaminaga | |
| 7,834,861 B2 | 11/2010 | Lee | |
| 7,877,707 B2 | 1/2011 | Westerman et al. | |
| 7,889,180 B2 | 2/2011 | Byun et al. | |
| 8,006,276 B2 | 8/2011 | Nakagawa et al. | |
| 8,086,275 B2 | 12/2011 | Wykes | |
| 8,175,653 B2 | 5/2012 | Smuga | |
| 2001/0022621 A1 | 9/2001 | Squibbs | |
| 2002/0000963 A1 | 1/2002 | Yoshida et al. | |
| 2002/0018051 A1* | 2/2002 | Singh | 345/173 |
| 2002/0060701 A1* | 5/2002 | Naughton et al. | 345/853 |
| 2002/0070961 A1 | 6/2002 | Xu et al. | |
| 2002/0128036 A1 | 9/2002 | Yach et al. | |
| 2002/0129061 A1 | 9/2002 | Swart et al. | |
| 2002/0142762 A1 | 10/2002 | Chmaytelli et al. | |
| 2002/0154176 A1 | 10/2002 | Barksdale et al. | |
| 2003/0003899 A1 | 1/2003 | Tashiro et al. | |
| 2003/0008686 A1 | 1/2003 | Park et al. | |
| 2003/0011643 A1 | 1/2003 | Nishihata | |
| 2003/0040300 A1 | 2/2003 | Bodic et al. | |
| 2003/0073414 A1 | 4/2003 | Capps | |
| 2003/0096604 A1 | 5/2003 | Vollandt | |
| 2003/0105827 A1 | 6/2003 | Tan et al. | |
| 2003/0135582 A1 | 7/2003 | Allen et al. | |
| 2003/0222907 A1 | 12/2003 | Heikes et al. | |
| 2003/0225846 A1 | 12/2003 | Heikes et al. | |
| 2004/0078299 A1 | 4/2004 | Down-Logan et al. | |
| 2004/0111673 A1 | 6/2004 | Bowman et al. | |
| 2004/0185883 A1 | 9/2004 | Rukman | |
| 2004/0212586 A1 | 10/2004 | Denny | |
| 2004/0217954 A1 | 11/2004 | O'Gorman et al. | |
| 2004/0250217 A1 | 12/2004 | Tojo et al. | |
| 2005/0054384 A1 | 3/2005 | Pasquale et al. | |
| 2005/0060647 A1 | 3/2005 | Doan et al. | |
| 2005/0060665 A1 | 3/2005 | Rekimoto | |
| 2005/0079896 A1 | 4/2005 | Kokko et al. | |
| 2005/0085215 A1 | 4/2005 | Kokko | |
| 2005/0085272 A1 | 4/2005 | Anderson et al. | |
| 2005/0114788 A1 | 5/2005 | Fabritius | |
| 2005/0143138 A1 | 6/2005 | Lee et al. | |
| 2005/0182798 A1 | 8/2005 | Todd et al. | |
| 2005/0183021 A1 | 8/2005 | Allen et al. | |
| 2005/0184999 A1 | 8/2005 | Daioku | |
| 2005/0216300 A1 | 9/2005 | Appelman et al. | |
| 2005/0232166 A1 | 10/2005 | Nierhaus | |
| 2005/0250547 A1 | 11/2005 | Salman et al. | |
| 2005/0273614 A1 | 12/2005 | Ahuja | |
| 2005/0280719 A1 | 12/2005 | Kim | |
| 2006/0004685 A1 | 1/2006 | Pyhalammi et al. | |
| 2006/0015812 A1 | 1/2006 | Cunningham | |
| 2006/0026013 A1 | 2/2006 | Kraft | |
| 2006/0059430 A1 | 3/2006 | Bells | |
| 2006/0074771 A1 | 4/2006 | Kim | |
| 2006/0103623 A1 | 5/2006 | Davis | |
| 2006/0129543 A1 | 6/2006 | Bates et al. | |
| 2006/0135220 A1 | 6/2006 | Kim et al. | |
| 2006/0136773 A1 | 6/2006 | Kespohl | |
| 2006/0152803 A1 | 7/2006 | Provitola | |
| 2006/0172724 A1 | 8/2006 | Linkert et al. | |
| 2006/0173911 A1 | 8/2006 | Levin et al. | |
| 2006/0199598 A1 | 9/2006 | Lee et al. | |
| 2006/0246955 A1 | 11/2006 | Nirhamo | |
| 2006/0253801 A1 | 11/2006 | Okaro et al. | |
| 2006/0259870 A1 | 11/2006 | Hewitt et al. | |
| 2006/0259873 A1 | 11/2006 | Mister | |
| 2006/0271520 A1 | 11/2006 | Ragan | |
| 2006/0281448 A1 | 12/2006 | Plestid et al. | |
| 2006/0293088 A1 | 12/2006 | Kokubo | |
| 2006/0294396 A1 | 12/2006 | Witman | |
| 2007/0011610 A1 | 1/2007 | Sethi et al. | |
| 2007/0015532 A1 | 1/2007 | Deelman | |
| 2007/0024646 A1 | 2/2007 | Saarinen | |
| 2007/0035513 A1 | 2/2007 | Sherrard et al. | |
| 2007/0038567 A1 | 2/2007 | Allaire et al. | |
| 2007/0054679 A1 | 3/2007 | Cho et al. | |
| 2007/0067272 A1 | 3/2007 | Flynt | |
| 2007/0073718 A1 | 3/2007 | Ramer | |
| 2007/0076013 A1 | 4/2007 | Campbell | |
| 2007/0080954 A1 | 4/2007 | Griffin | |
| 2007/0082707 A1 | 4/2007 | Flynt et al. | |
| 2007/0082708 A1 | 4/2007 | Griffin | |
| 2007/0127638 A1 | 6/2007 | Doulton | |
| 2007/0157089 A1 | 7/2007 | Van Os et al. | |
| 2007/0171192 A1 | 7/2007 | Seo et al. | |
| 2007/0182595 A1 | 8/2007 | Ghasabian | |
| 2007/0185847 A1 | 8/2007 | Budzik et al. | |
| 2007/0192707 A1 | 8/2007 | Maeda et al. | |
| 2007/0211034 A1 | 9/2007 | Griffin et al. | |
| 2007/0214429 A1 | 9/2007 | Lyudovyk et al. | |
| 2007/0216651 A1 | 9/2007 | Patel | |
| 2007/0225022 A1 | 9/2007 | Satake | |
| 2007/0233654 A1 | 10/2007 | Karlson | |
| 2007/0238488 A1 | 10/2007 | Scott | |
| 2007/0247435 A1* | 10/2007 | Benko et al. | 345/173 |
| 2007/0250583 A1 | 10/2007 | Hardy | |
| 2007/0253758 A1 | 11/2007 | Suess | |
| 2007/0256029 A1 | 11/2007 | Maxwell | |
| 2007/0257891 A1* | 11/2007 | Esenther et al. | 345/173 |
| 2007/0257933 A1 | 11/2007 | Klassen | |
| 2007/0262964 A1 | 11/2007 | Zotov et al. | |
| 2007/0273663 A1 | 11/2007 | Park et al. | |
| 2007/0280457 A1 | 12/2007 | Aberethy | |
| 2007/0281747 A1 | 12/2007 | Pletikosa | |
| 2008/0005668 A1 | 1/2008 | Mavinkurve | |
| 2008/0032681 A1 | 2/2008 | West | |
| 2008/0036743 A1 | 2/2008 | Westerman | |
| 2008/0048986 A1 | 2/2008 | Khoo | |
| 2008/0052370 A1 | 2/2008 | Snyder | |
| 2008/0057910 A1 | 3/2008 | Thoresson et al. | |
| 2008/0057926 A1 | 3/2008 | Forstall et al. | |
| 2008/0076472 A1 | 3/2008 | Hyatt | |
| 2008/0082934 A1 | 4/2008 | Kocienda et al. | |
| 2008/0085700 A1 | 4/2008 | Arora | |
| 2008/0102863 A1 | 5/2008 | Hardy | |
| 2008/0114535 A1 | 5/2008 | Nesbitt | |
| 2008/0132252 A1 | 6/2008 | Altman et al. | |
| 2008/0155425 A1 | 6/2008 | Murthy et al. | |
| 2008/0165132 A1 | 7/2008 | Weiss | |
| 2008/0165136 A1 | 7/2008 | Christie et al. | |
| 2008/0165163 A1 | 7/2008 | Bathiche | |
| 2008/0167058 A1 | 7/2008 | Lee et al. | |
| 2008/0168403 A1 | 7/2008 | Westerman et al. | |
| 2008/0172609 A1 | 7/2008 | Rytivaara | |
| 2008/0180399 A1 | 7/2008 | Cheng | |
| 2008/0182628 A1 | 7/2008 | Lee et al. | |
| 2008/0189658 A1 | 8/2008 | Jeong et al. | |
| 2008/0198141 A1 | 8/2008 | Lee et al. | |
| 2008/0208973 A1 | 8/2008 | Hayashi | |
| 2008/0222560 A1 | 9/2008 | Harrison | |

| | | |
|---|---|---|
| 2008/0222569 A1 | 9/2008 | Champion |
| 2008/0242362 A1 | 10/2008 | Duarte |
| 2008/0259042 A1 | 10/2008 | Thorn |
| 2008/0261660 A1 | 10/2008 | Huh et al. |
| 2008/0270558 A1 | 10/2008 | Ma |
| 2008/0297475 A1 | 12/2008 | Woolf et al. |
| 2008/0301046 A1 | 12/2008 | Martinez |
| 2008/0301575 A1 | 12/2008 | Fermon |
| 2008/0309626 A1* | 12/2008 | Westerman et al. ......... 345/173 |
| 2008/0316177 A1 | 12/2008 | Tseng |
| 2008/0317240 A1 | 12/2008 | Chang et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0037469 A1 | 2/2009 | Kirsch |
| 2009/0051671 A1 | 2/2009 | Konstas |
| 2009/0061948 A1 | 3/2009 | Lee et al. |
| 2009/0064055 A1 | 3/2009 | Chaudhri |
| 2009/0077649 A1 | 3/2009 | Lockhart |
| 2009/0083656 A1 | 3/2009 | Dukhon |
| 2009/0085851 A1 | 4/2009 | Lim |
| 2009/0085878 A1 | 4/2009 | Heubel |
| 2009/0089215 A1 | 4/2009 | Newton |
| 2009/0109243 A1 | 4/2009 | Kraft |
| 2009/0117942 A1 | 5/2009 | Boningue et al. |
| 2009/0140061 A1 | 6/2009 | Schultz et al. |
| 2009/0140986 A1* | 6/2009 | Karkkainen et al. ......... 345/173 |
| 2009/0153492 A1 | 6/2009 | Popp |
| 2009/0160809 A1 | 6/2009 | Yang |
| 2009/0163182 A1 | 6/2009 | Gatti et al. |
| 2009/0164888 A1 | 6/2009 | Phan |
| 2009/0205041 A1 | 8/2009 | Michalske |
| 2009/0228825 A1 | 9/2009 | Van Os et al. |
| 2009/0265662 A1 | 10/2009 | Bamford |
| 2009/0284482 A1 | 11/2009 | Chin |
| 2009/0298547 A1 | 12/2009 | Kim et al. |
| 2009/0307589 A1 | 12/2009 | Inose et al. |
| 2009/0307623 A1* | 12/2009 | Agarawala et al. ........... 715/765 |
| 2009/0313584 A1 | 12/2009 | Kerr et al. |
| 2009/0315847 A1 | 12/2009 | Fujii |
| 2010/0008490 A1 | 1/2010 | Gharachorloo et al. |
| 2010/0075628 A1 | 3/2010 | Ye |
| 2010/0079413 A1* | 4/2010 | Kawashima et al. ......... 345/175 |
| 2010/0087169 A1 | 4/2010 | Lin |
| 2010/0087173 A1 | 4/2010 | Lin |
| 2010/0100839 A1 | 4/2010 | Tseng et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0107068 A1 | 4/2010 | Butcher |
| 2010/0107100 A1 | 4/2010 | Schneekloth |
| 2010/0145675 A1 | 6/2010 | Lloyd et al. |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0167699 A1 | 7/2010 | Sigmund et al. |
| 2010/0180233 A1 | 7/2010 | Kruzeniski et al. |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0311470 A1 | 12/2010 | Seo et al. |
| 2010/0321403 A1 | 12/2010 | Inadome |
| 2011/0018806 A1* | 1/2011 | Yano .............................. 345/163 |
| 2011/0055773 A1* | 3/2011 | Agarawala et al. ............ 715/863 |
| 2011/0093778 A1 | 4/2011 | Kim et al. |
| 2011/0231796 A1* | 9/2011 | Vigil .............................. 715/810 |
| 2012/0028687 A1 | 2/2012 | Wykes et al. |
| 2012/0050185 A1 | 3/2012 | Davydov et al. |

FOREIGN PATENT DOCUMENTS

| | | |
|---|---|---|
| EP | 0583060 | 2/1994 |
| EP | 1752868 | 2/2007 |
| JP | 2004227393 | 8/2004 |
| JP | 2004357257 | 12/2004 |
| KR | 200303655 | 2/2003 |
| KR | 20060019198 | 3/2006 |
| KR | 1020070036114 | 4/2007 |
| KR | 1020070098337 | 10/2007 |
| KR | 20070120368 | 12/2007 |
| KR | 1020080025951 | 3/2008 |
| KR | 1020080076390 | 8/2008 |
| KR | 100854333 | 9/2008 |
| KR | 1020080084156 | 9/2008 |
| KR | 1020080113913 | 12/2008 |
| KR | 1020090041635 | 4/2009 |
| TW | 201023026 | 6/2010 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2009000043 | 12/2008 |
| WO | WO-2009049331 | 4/2009 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010135155 | 11/2010 |

OTHER PUBLICATIONS

"Apple iPhone—8GB AT&T", Retrieved from: <http://nytimes.com.com/smartphones/apple-iphone-8gb-at/4515-6452_7-32309245.html> on Nov. 20, 2008, (Jun. 29, 2007), 11 pages.

"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., (Nov. 11, 2008), 3 pages.

"Blackberry office tools: Qwerty Convert", Retrieved from: <http://blackberrysoftwarelist.net/blackberry/download-software/blackberry-office/qwerty_convert.aspx> on Nov. 20, 2008, 1 page.

"Calc4M", Retrieved from: <http://www.hellebo.com/Calc4M.html> on Dec. 11, 2008, (Sep. 10, 2008), 4 Pages.

"Content-Centric E-Mail Message Analysis in Litigation Document Reviews", Retrieved from: http://www.busmanagement.com/article/Issue-14/Data-Management/Content-Centric-E-Mail-Message-Analysis-in-Litigation-Document-Reviews/., (May 6, 2009), 4 Pages.

"Dial a number", Retrieved from: <http://www.phonespell.org/ialhelp.html> on Nov. 20, 2008, 1 page.

"DuoSense™ Multi-Touch Gestures", Retrieved from: <http://www.n-trig.com/Data/Uploads/Misc/DuoSenseMTG_final.pdf>, (Jul. 2008), 4 pages.

"Elecont Quick Desktop 1.0.43", Retrieved from: <http://handheld.softpedia.com/get/System-Utilities/Launcher-Applications/Elecont-Quick-Desktop-72131.shtml> on May 5, 2009., (Mar. 13, 2009), 2 pages.

"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, (Aug. 1, 2008), 14 pages.

"Freeware.mobi", Retrieved from: <http://www.palmfreeware.mobi/download-palette.html> Nov. 6, 2008, (Oct. 9, 2001), 2 pages.

"How do you dial 1-800-FLOWERS", Retrieved from: <http://blogs.msdn.com/windowsmobile/archive/2007/02/06/how-do-you-dial-1-800-flowers.aspx> on Nov. 20, 2008, (Feb. 6, 2007), 24 pages.

"HTC Shows HTC Snap with Snappy Email Feature", Retrieved from: <http://www.wirelessandmobilenews.com/smartphones/_on May 5, 2009>, (May 4, 2009), 10 Pages.

"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, (May 13, 2008), 11 pages.

"Internet Explorer Window Restrictions", Retrieved from: <http://www.addict3d.org/news/2012/download.html> on Oct. 22, 2008, Microsoft TechNet,(Oct. 22, 2008), 6 pages.
"Introduction to Windows Touch", Retrieved from: <http://download.microsoft.com/download/a/d/f/adf1347d-08dc-41a4-9084-623b1194d4b2/Win7_touch.docx>, (Dec. 18, 2008), pp. 1-7.
"Keyboard (5)", Retrieved from: <http://landru.uwaterloo.ca/cgi-bin/man.cgi?section=5&topic=keyboard> on Dec. 11, 2008., (Aug. 11,1997),8 Pages.
"Keyboard Shortcuts", Retrieved from: <http://www.pctoday.com/editorial/article. asp?article=articles%2F2005%A2Ft0311%2F26t11%2F26t11.asp> on Aug. 3, 2009., (Nov. 2005), 5 pages.
"Kiosk Browswer Chrome Customization Firefox 2.x", Retrieved from: <http://stlouis-shopper.com/cgi-bin/mozdev-wiki/,pl?ChromeCustomization> on Oct. 22, 2008 Making a new chrome for the kioask browswer, Kiosk Project Kiosk Browser Chrome Customization Firefox-2.x,(Aug. 16, 2007), 2 pages.
"Live Photo Gallery—Getting Started—from Camera to Panorama", Retrieved from: <http://webdotwiz.spaces.live.com/blog/cns!2782760752B93233!1729.entry> on May 5, 2009., (Sep. 2008), 7 Pages.
"MIDTB Tip Sheet: Book Courier", Retrieved from: <http://www.midtb.org/tipsbookcourier.htm> on Dec. 11, 2008., (Sep. 26, 2005), 6 Pages.
"Mobile/UI/Designs/TouchScreen", Retrieved from: <https://wiki.mozilla.org/Mobile/UI/Designs/TouchScreen> on May 6, 2009., (Feb. 3, 2009), 15 Pages.
"Multi-touch",Retrieved from <http://en.wikipedia.org/wiki/Multi-touch#Microsoft_Surface> on Apr. 24, 2009, (Apr. 17, 2009), 8 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., (Jan. 27, 2006), 2 Pages.
"Oracle8i Application Developers Guide—Advanced Queuing Release 2 (8.1.6)", Retrieved from: http://www.cs.otago.ac.nz/oradocs/appdev.817/a76938/adq01in5.htm on May 6, 2009., (Dec. 1999), 8 pages.
"Oracle8i Application Developer's Guide—Advanced Queuing", Retrieved from: http://www.cs.umbc.edu/help/oracle8/server.815/a68005/03_adq1i.htm on May 6, 2009., (Feb. 1999), 29 Pages.
"Oracle8i Concepts Release 8.1.5", Retrieved from: http://www.cs.umbc.edu/help/oracle8/server.815/a67781/c16queue.htm on May 6, 2009., (Feb. 1999), 10 Pages.
"Palette Extender 1.0.2", Retrieved from: <http://palette-extender.en.softonic.com/symbian> on Nov. 6, 2008, (Jan. 21, 2003), 2 pages.
"Parallax Scrolling", Retrieved from: <http://en.wikipedia.org/wiki/Parallax_scrolling> on May 5, 2009), (May 4, 2009), 3 Pages.
"PocketShield—New Screenlock App for the HTC Diamond and Pro", Retrieved from: <http://wmpoweruser.com/?tag=htc-touch-diamond> on Nov. 12, 2008, (Nov. 6, 2008), 13 pages.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., (Jul. 15, 2005), 5 Pages.
"SecureMe-Anti-Theft Security Application for S60 3rd", Retrieved from: <http:/www.killermobile.com/newsite/mobile-software/s60-applications/secureme-%11-anti%11theft-security-application-for-s60-3rd.htm> on Nov. 12, 2008, (Nov. 11, 2008), 2 pages.
"Symbian Applications", Retrieved from: <http://symbianfullversion.blogspot.com/2008_12_01_archive.html> on May 5, 2009., 51 Pages.
"Touch Shell Free", Retrieved from: <http://www.pocketpcfreeware.mobi/download-touch-shell-free.html> on May 5, 2009., (Feb. 23, 2009), 2 Pages.
"Winterface Review", Retrieved from: <http://www.mytodayscreen.com/winterface-review/> on Nov. 12, 2008), (Jul. 9, 2008), 42 pages.
"Womma", Retrieved from: <http://www.womma.org/blog/links/wom-trends/> on May 5, 2009., (2007), 70 Pages.
Dolcourt, Jessica "Webware", Retrieved from: <http://news.cnet.com/webware/?categoryId=2010> on May 5, 2009, 13 Pages.
Gade, Lisa "Samsung Alias u740", Retrieved from: <http://www.mobiletechreview.com/phones/Samsung-U740.htm> on Nov. 20, 2008, (Mar. 14, 2007), 6 pages.
Gao, Rui "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, (Feb. 2007), pp. 1-42.
Ha, Rick et al., "SIMKEYS: An Efficient Keypad Configuration for Mobile Communications", Retrieved from: <http://ieeexplore.ieee.org/stamp/stamp.jsp?arnumber=01362557.> on Dec. 17, 2008, (Nov. 2004), 7 Pages.
Harrison, Richard "Symbian OS C++ for Mobile Phones vol. 3", Retrieved from: <http://_www.amazon.co.uk/Symbian-OS-Mobile-Phones-Press/dp/productdescription/0470066415> on Oct. 23, 2008, Symbian Press,(Jun. 16, 2003), 4 pages.
Hickey, Andrew R., "Google Android has Landed: T-Mobile, HTC Unveil G1", Retrieved from: <http://www.crn.com/retail/210603348> on Nov. 26, 2008., (Sep. 23, 2008), 4 pages.
Kcholi, Avi "Windows CE .NET Interprocess Communication", Retrieved from http://msdn.microsoft.com/en-us/library/ms836784.aspx on Jul. 17, 2008., (Jan. 2004), 15 Pages.
Mann, Richard et al., "Spectrumk Analysis of Motion Parallax in a 3D Cluttered Scene and Application to Egomotion", Retrieved from: <http://www.cs.uwaterloo.ca/~mannr/snow/josa-mann-langer.pdf.> (Sep. 2005), pp. 1717-1731.
Mao, Jeng "Comments of Verizon Wireless Messaging Services, LLC", Retrieved from: http://www.ntia.doc.gov/osmhome/warnings/comments/verizon.htm on May 6, 2009., (Aug. 18, 2000), 5 Pages.
Mei, Tao et al., "Probabilistic Multimodality Fusion for Event Based Home Photo Clustering", Retrieved from: <http://ieeexplore.ieee.org//stamp/stamp.jsp?tp=&arnumber=04036960.>, (Dec. 26, 2006), pp. 1757-1760.
Nordgren, Peder "Development of a Touch Screen Interface for Scania Interactor", Retrieved from <http://www.cs.umu.se/education/examina/Rapporter/PederNordgren.pdf>, (Apr. 10, 2007), 67 Pages.
Oliver, Sam "Potential iPhone Usability and Interface Improvements", Retrieved from: <http://www.appleinsider.com/articles/08/09/18/potential_iphone_usability_and_interface_improvements.html> on Nov.12, 2008, (Sep. 18, 2008), 4 pages.
Oryl, Michael "Review: Asus P527 Smartphone for North America", Retrieved from: <http://www.mobileburn.com/review.jsp?Id=4257> on Dec. 17, 2008., (Mar. 5, 2008), 1 Page.
Padilla, Alfredo "Palm Treo 750 Cell Phone Review—Hardware", Retrieved from: <http://www.wirelessinfo/com/content/palm-Treo-750-Cell-Phone-Review/Hardware.htm> on Dec. 11, 2008., (Mar. 17, 2007), 4 Pages.
Raghaven, Gopal et al., "Model Based Estimation and Verification of Mobile Device Performance", Retrieved from http://alumni.cs.ucsb.edu/~raimisl/emsoft04_12.pdf., (Sep. 27-29, 2004), 10 Pages.
Reed, Brad "Microsoft Demos Windows Mobile 6.1 at CTIA", Retrieved from: <http://www.networkworld.com/news/2008/040208-ctia-microsoft-windows-mobile.html> on Jul. 18, 2008., (Apr. 2, 2008), 1 page.
Remond, Mickael "Mobile Marketing Solutions", Retrieved from: <http://www.mobilemarketindmagazine.co.uk/mobile_social_networking/> on May 5, 2009., (Apr. 28, 2009), 16 Pages.
Rice, Stephen V., et al., "A System for Searching Sound Palettes", Retrieved from: <http://www.comparisonics.com/FindSoundsPalettePaper.pdf>, (Feb. 28-29, 2008), 6 pages.
Singh, Kundan et al., "CINEMA: Columbia InterNet Extensible Multimedia Architecture", Retrieved from http://www1.cs.columbia.edu/~library/TR-repository/reports/reports-2002/cucs-011-02.pdf, (Sep. 3, 2002), 83 Pages.
Steinicke, Frank et al., "Multi-Touching 3D Data: Towards Direct Interaction in Stereoscopic Display Environments coupled with Mobile Devices", Retrieved from: <http://viscg.uni-muenster.de/publications/2008/SHSK08/ppd-workshop.-pdf.>, (Jun. 15, 2008), 4 Pages.

Terpstra, Brett "Beta Beat: Grape, a New Way to Manage Your Desktop Clutter", Retrieved from: Beta Beat: Grape, a New Way to Manage Your Desktop Clutter on May 6, 2009., (Apr. 14, 2009), 16 Pages.

Vallerio, Keith S., et al., "Energy-Efficient Graphical User Interface Design", Retrieved from: <http://www.cc.gatech.edu/classes/AY2007/cs7470_fall/zhong-energy-efficient-user-interface.pdf>, (Jun. 10, 2004), pp. 1-13.

Wilson, Tracy V., "How the iPhone Works", Retrieved from: <http://electronics.howstuffworks.com/iphone2.htm> on Apr. 24, 2009, (Jan. 2007), 9 pages.

Yang, Seungji et al., "Semantic Photo Album Based on MPEG-4 Compatible Application Format", Retrieved from: <http://ieeexplore.ieee.org/stamp/stamp.jsp?arnumber=04146254.>, (2007), 2 Pages.

"PCT Search Report and Written Opinion", Application No. PCT/US2009/061382, (May 26, 2010),10 pages.

"PCT Search Report and Written Opinion", Application No. PCT/US2009/061735, (Jun. 7, 2010),11 pages.

"Non-Final Office Action", U.S. Appl. No. 12/244,545, (Aug. 17, 2011), 15 pages.

"Non-Final Office Action", U.S. Appl. No. 12/413,977, (Jul. 19, 2011), 17 pages.

"Non-Final Office Action", U.S. Appl. No. 12/414,382, (Jul. 26, 2011), 9 pages.

"Non-Final Office Action", U.S. Appl. No. 12/414,434, (Aug. 2, 2011), 6 pages.

"Non-Final Office Action", U.S. Appl. No. 12/414,455, (Aug. 29, 2011), 8 pages.

"Non-Final Office Action", U.S. Appl. No. 12/414,458, (Jul. 6, 2011), 8 pages.

"Non-Final Office Action", U.S. Appl. No. 12/414,476, (Aug. 3, 2011), 21 pages.

"Non-Final Office Action", U.S. Appl. No. 12/433,605, (Jun. 24, 2011), 10 pages.

"Non-Final Office Action", U.S. Appl. No. 12/433,667, (Jun. 7, 2011), 15 pages.

"Non-Final Office Action", U.S. Appl. No. 12/469,458, (Jul. 1, 2011), 15 pages.

"Non-Final Office Action", U.S. Appl. No. 12/484,799, (Aug. 11, 2011), 12 pages.

"Notice of Allowance", U.S. Appl. No. 12/414,458, (Aug. 10, 2011), 6 pages.

"PCT Search Report and Written Opinion", Application No. PCT/US2010/028699, (Oct. 4, 2010),10 pages.

"PCT Search Report and Written Opinion", Application No. PCT/US2010/028555, (Oct. 12, 2010),10 pages.

"PCT Search Report", Application No. PCT/US2009/061864, (May 14, 2010),10 pages.

"International Search Report", Application No. PCT/US2010/028553, Application Filing Date: Mar. 24, 2010,(Nov. 9, 2010), 9 pages.

"PCT Search Report and Written Opinion", Application No. PCT/US2010/034772, (Dec. 29, 2010), 12 pages.

"PCT Search Report and Written Opinion", PCT Application No. PCT/US2010/038730, (Jan. 19, 2011), 8 pages.

"Advisory Action", U.S. Appl. No. 12/414,382, (Jan. 20, 2012),3 pages.

"Final Office Action", U.S. Appl. No. 12/244,545, (Dec. 7, 2011),16 pages.

"Final Office Action", U.S. Appl. No. 12/413,977, (Nov. 17, 2011),16 pages.

"Final Office Action", U.S. Appl. No. 12/414,382, (Dec. 23, 2011),7 pages.

"Final Office Action", U.S. Appl. No. 12/414,476, (Dec. 1, 2011),20 pages.

"Final Office Action", U.S. Appl. No. 12/433,605, (Feb. 3, 2012),11 pages.

"Final Office Action", U.S. Appl. No. 12/433,667, (Sep. 13, 2011),17 pages.

"Final Office Action", U.S. Appl. No. 12/469,458, (Nov. 17, 2011),15 pages.

"Final Office Action", U.S. Appl. No. 12/469,480, (Feb. 9, 2012),17 pages.

"Non-Final Office Action", U.S. Appl. No. 12/414,434, (Jan. 17, 2012),7 pages.

"Non-Final Office Action", U.S. Appl. No. 12/433,667, (Feb. 3, 2012),16 pages.

"Non-Final Office Action", U.S. Appl. No. 12/469,419, (Nov. 9, 2011),15 pages.

"Non-Final Office Action", U.S. Appl. No. 12/469,480, (Sep. 22, 2011),14 pages.

"Non-Final Office Action", U.S. Appl. No. 12/484,845, (Dec. 7, 2011),16 pages.

"Non-Final Office Action", U.S. Appl. No. 12/560,081, (Dec. 7, 2011),16 pages.

"Notice of Allowance", U.S. Appl. No. 12/414,455, (Jan. 4, 2012),4 pages.

"Notice of Allowance", U.S. Appl. No. 12/414,458, (Oct. 31, 2011),2 pages.

"Notice of Allowance", U.S. Appl. No. 12/414,458, (Nov. 29, 2011),2 pages.

La, Nick "Parallax Gallery", Available at <http://webdesignerwall.comtutorials/parallax-gallery/comment-page-1>,(Apr. 25, 2008),16 pages.

Roberts, Neil "Touching and Gesturing on the iPhone", Available at <http://www.sitepen.com/blog/2008/07/10/touching-and-gesturing-on-the-iphone/comments-pare-1>,(Jul. 10, 2008),16 pages.

"Advisory Action", U.S. Appl. No. 12/433,605, (Apr. 5, 2012), 3 pages.

"Extended European Search Report", European Patent Application Number 09818253.8, (Apr. 10, 2012),7 pages.

"Final Office Action", U.S. Appl. No. 12/484,799, (Apr. 30, 2012), 13 pages.

"Non-Final Office Action", U.S. Appl. No. 12/244,545, (Mar. 27, 2012), 18 pages.

"Non-Final Office Action", U.S. Appl. No. 12/414,434, (May 31, 2012), 7 pages.

"Non-Final Office Action", U.S. Appl. No. 12/469,419, (May 23, 2012), 13 pages.

"Notice of Allowance", U.S. Appl. No. 12/414,382, (Apr. 4, 2012), 4 pages.

* cited by examiner

DROP TARGET GESTURES

BACKGROUND

Portable computer devices are increasingly more common and mobile, such as laptop computers, tablet PCs, ultra-mobile PCs, as well as other mobile data, messaging, and/or communication devices. When a user holds a small, portable device such as a tablet PC or ultra-mobile PC that has an integrated touch-screen, a common interaction technique is to hold the device with one hand and interact with the touch-screen with fingers of the other hand. For example, the user can tap-touch targets or user interface elements on the touch-screen with a finger, such as to drag-and-drop an object to move the display location of the object.

The common drag-and-drop technique may require an additional gesture or user input to initiate the technique because a device may not be able to differentiate between a tap-touch to open or execute the object and a tap-touch to initiate a drag-and-drop of the object. Additionally, an object may be lost while being dragged to a drop location, such as when a user inadvertently lifts the contact finger before successfully dragging the object to the drop location. This can result in a negative user experience, particularly when a user intends to individually select and drag several objects to the same drop location, such as when several files or documents are individually selected and dragged to a drop location that initiates file or document deletion.

SUMMARY

This summary is provided to introduce simplified concepts of drop target gestures. The simplified concepts are further described below in the Detailed Description. This summary is not intended to identify essential features of the claimed subject matter, nor is it intended for use in determining the scope of the claimed subject matter.

Embodiments of drop target gestures are described. In various embodiments, a first input on a touch-screen is detected and determined as a selection of an object displayed on the touch-screen. A second input on the touch-screen is detected and determined as a selection of a target position to move the object, the second input being detected while the first input remains in contact with the touch-screen. The first input is then detected as no longer being in contact with the touch-screen, and a display of the object is initiated at the target position on the touch-screen giving the appearance that the object moves from a location of the first input to the second input.

In other embodiments, an initial input on a touch-screen is detected and determined as a selection of a target position to move multiple objects displayed on the touch-screen. Subsequent inputs on the touch-screen are detected and determined as object selections to move the objects proximate the target position. A display of the objects is then initiated at the target position on the touch-screen giving the appearance that the objects move from respective locations of the subsequent inputs to the target position.

BRIEF DESCRIPTION OF THE DRAWINGS

Embodiments of drop target gestures are described with reference to the following drawings. The same numbers are used throughout the drawings to reference like features and components.

DETAILED DESCRIPTION

Embodiments of drop target gestures provide techniques to move the display location of objects on a user interface, such as when displayed on a touch-screen of a portable computer device that supports multi-touch inputs.

In an embodiment, an object that is displayed on a touch-screen can be moved for display at a selected target position on the touch-screen. The object can be selected with a first touch input, and while the first touch input remains in contact with the touch-screen, the target position can be selected with a second touch input. When the first touch input is detected as no longer being in contact with the touch-screen, the object can be displayed at the target position to give the appearance that the object moved to the target position. For example, a user of a portable device can select a displayed object with a finger touch input, and while maintaining contact with the touch-screen with the first finger, select the target position on the touch-screen using a second finger. The user can then lift the first finger from the touch-screen and the object is displayed at the target position to give the appearance of having moved from the location of the first touch input to the target position.

In another embodiment, a target position on the touch-screen can be selected first as the location to move multiple objects that are displayed on a user interface. The target position can be selected with an initial touch input, and while the initial touch input remains in contact with the touch-screen, the objects can each be selected with subsequent touch inputs to move the objects from each respective object location to the target position. For example, a user of a portable device can select the target position with a finger touch input, and while maintaining contact with the touch-screen with the first finger, select each of the objects to be moved with subsequent finger touch inputs using a second finger.

While features and concepts of the described systems and methods for drop target gestures can be implemented in any number of different environments, systems, and/or various configurations, embodiments of drop target gestures are described in the context of the following example systems and environments.

Figure 1:
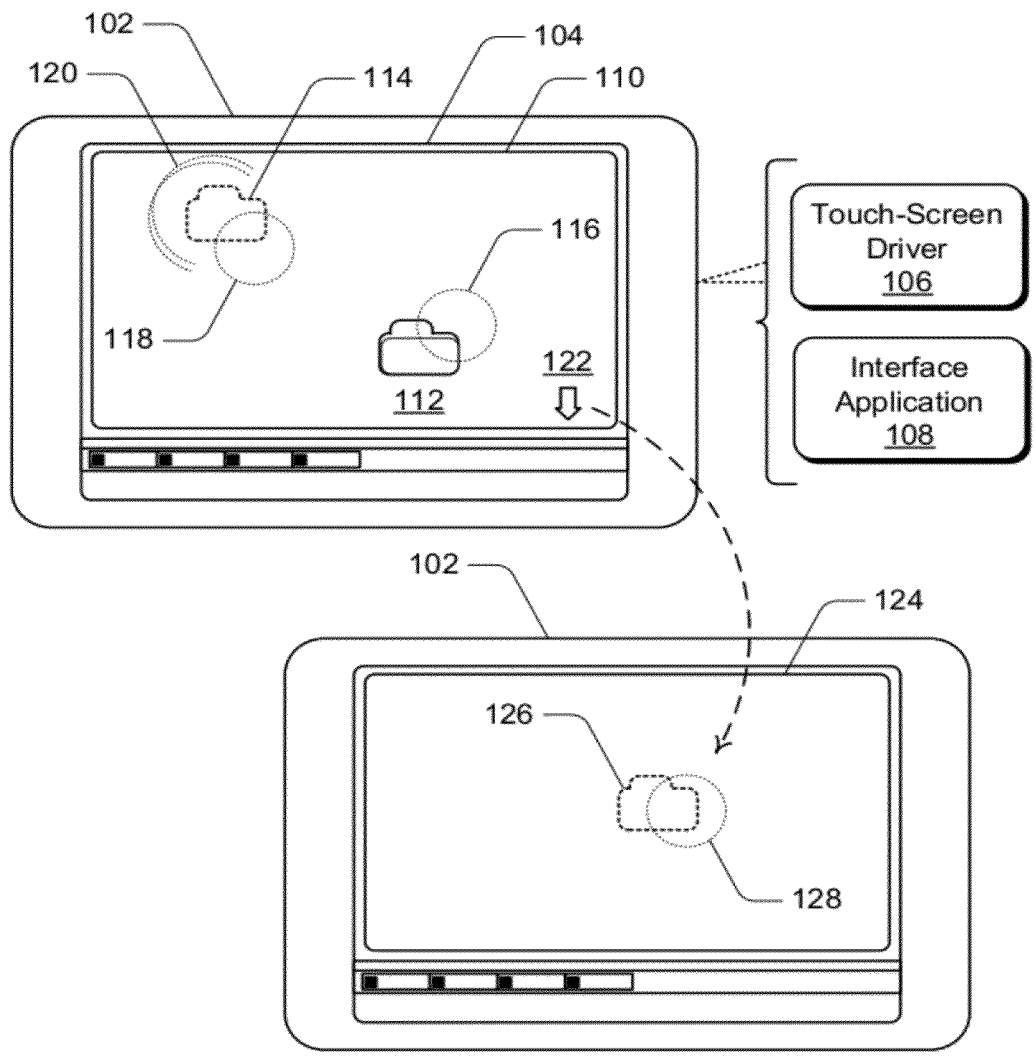
FIG. 1 illustrates an example of a portable device that can implement various embodiments of drop target gestures.

FIG. 1 illustrates an example 100 of a portable device 102 that can implement various embodiments of drop target gestures. Portable device 102 is an example of any of the various types of portable devices described with reference to FIG. 3 and can also be implemented with any number and combination of differing components as described with reference to the example device shown in FIG. 5. Portable device 102 includes an integrated touch-screen 104 to display user interfaces, user interface elements, user-selectable controls, various displayable objects, and the like. Portable device 102 also includes at least a touch-screen driver 106 and an interface application 108 to initiate display of a user interface 110 and the various user interface elements, user-selectable controls, displayable objects, and the like on user interface 110.

In an embodiment of drop target gestures, an object 112 that is displayed on the touch-screen 104 can be moved for display at a target position 114 on the touch-screen. The object 112 can be selected with a first touch input 116, and while the first touch input 116 remains in contact with the touch-screen, the target position 114 can be selected with a second touch input 118. When the first touch input 116 is detected as no longer being in contact with the touch-screen, the object 112 can be displayed at the target position 114 to give the appearance that the object moved to the target position. For example, a user of portable device 102 can select object 112 with a finger touch input, and while maintaining contact with the touch-screen 104 with the first finger, select the target position 114 with another finger touch input using a second finger. The user can then lift the first finger from the touch-screen 104 and the object 112 is displayed at the target position 114 to give the appearance of having moved from the location of the first touch input 116 to the target position 114, which is proximate the second touch input 118.

This drop target gesture technique may be referred to as a tap-n-drop or press-n-drop gesture, such as when an object is moved for display or a file is moved to a delete bin (e.g., commonly referred to as a recycle bin or trash file) to be deleted. This drop target gesture technique can be implemented for a device that supports multi-touch input. The touch-screen driver 106 can be implemented to detect various drop target gestures that are determined as a selection of a displayed object, such as a press and hold contact, a combination touch and gesture motion, a double tap, and any other type of object selection gesture and/or motion.

The touch-screen driver 106 is implemented to detect the first input 116 on the touch-screen 104, and the interface application 108 then determines that the first input 116 is a selection of the object 112 that is displayed on the touch-screen. The touch-screen driver 106 can also detect the second input 118 on the touch-screen 104 that is determined by the interface application 108 as a selection of the target position 114 to move the object. The second input 118 is detected while the first input 116 remains in contact with the touch-screen, and the touch-screen driver 106 can then detect when the first input 116 is no longer in contact with the touch-screen. The interface application 108 is implemented to then initiate a display of the object 112 at the target position 114 on the touch-screen. In an implementation, the object 112 is registered with the interface application 108 as a movable object that is configured for selection and can be moved for display at a target position, or proximate a target position.

In an implementation, the touch-screen driver 106 can detect the first input 116 on the touch-screen 104, and the interface application 108 can then initiate a displayable indication 120 to highlight the target position 114 when the first input 116 on the touch-screen is detected. The displayable indication 120 can be any type of highlight, color, image, and/or graphic to illustrate a possible location or locations where the object 112 can be moved, such as to the target position 114. It should be noted that the representations of the target position 114, of the inputs (e.g., first input 116 and second input 118), and of the displayable indication 120 are merely illustrative for discussion purposes. When embodiments of drop target gestures are implemented, the various representations may or may not appear on the touch-screen and/or on a user interface.

In another implementation, the touch-screen driver 106 can detect the first input 116 on the touch-screen 104, and the interface application 108 can then initiate a display of a selectable control 122 that indicates a target position for the object 112 is located on a different user interface than the current user interface 110 on which the object is displayed. The touch-screen driver 106 can detect a selection input of the selectable control 122, such as a user touch or similar tap input, and the interface application 108 can initiate a display of a different user interface 124 on the touch-screen. The different user interface 124 includes a target position 126 where the object 112 can be moved.

For example, a user of portable device 102 can select object 112 with a finger touch input, and while maintaining the touch input contact with the first finger on touch-screen 104, the user can tap or touch input the selectable control 122 to initiate a display of the different user interface 124, and select the target position 126 with another finger touch input 128 using a second finger. The user can then lift the first finger from the touch-screen 104 and the object 112 is displayed at the target position 126 to give the appearance of having moved from the location of the first touch input 116 to the target position at the second touch input 128. It should be noted that, even though the display of the user interface changes from user interface 110 to the different user interface 124, the touch-screen driver 106 still recognizes or detects the first finger touch input 116 at the same location on the touch-screen until the touch contact is released.

Figure 2:
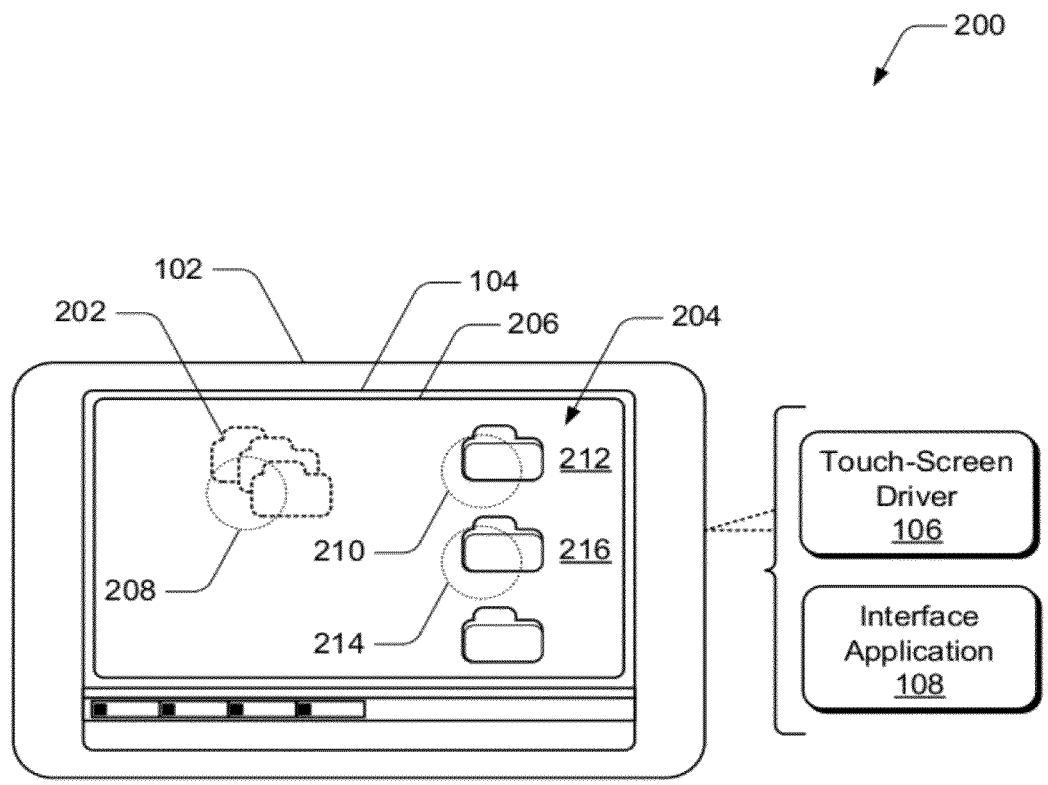
FIG. 2 illustrates another example of the portable device that can implement various embodiments of drop target gestures.

FIG. 2 illustrates another example 200 of portable device 102. In an embodiment of drop target gestures, a target position 202 on the touch-screen 104 can be selected as a location to move multiple objects 204 that are displayed on a user interface 206. The target position 202 can be selected first with an initial touch input 208, and while the initial touch input 208 remains in contact with the touch-screen, the objects 204 can each be selected with subsequent touch inputs to move the objects from each respective object location to the target position 202. For example, a user of portable device 102 can select the target position 202 with a finger touch input, and while maintaining contact with the touch-screen 104 with the first finger, select each of the objects 204 with subsequent finger touch inputs using a second finger. this drop target gesture technique may be referred to as drop target anchoring, and can be implemented for a device that supports multi-touch input.

The touch-screen driver 106 is implemented to detect the initial input 208 on the touch-screen 104, and the interface application 108 then determines the initial input 208 as a selection of the target position 202 to move the objects 204 displayed on the touch-screen. The touch-screen driver 106 can also detect subsequent inputs on the touch-screen 104 that are determined by the interface application 108 as object selections to move the objects 204 proximate the target position. For example, the touch-screen driver 106 can detect a touch input 210 to move object 212 proximate the target position 202, and detect a subsequent touch input 214 to move object 216 proximate the target position 202.

In an implementation, the subsequent inputs are detected while the initial input 208 remains in contact with the touch-screen, as detected by the touch-screen driver 106. The interface application 108 is implemented to then initiate a display of the objects 204 at the target position 202 on the touch-screen, thus giving the appearance that the objects move from each respective location to the target position 202. As described with reference to target position 114 above, the interface application 108 can similarly initiate a displayable indication (not shown) to highlight the objects 204 when the initial input 208 on the touch-screen is detected at the target position 202. A displayable indication can be any type of highlight, color, image, and/or graphic to illustrate possible objects 204 that can be moved to the target position 202.

Figure 3:
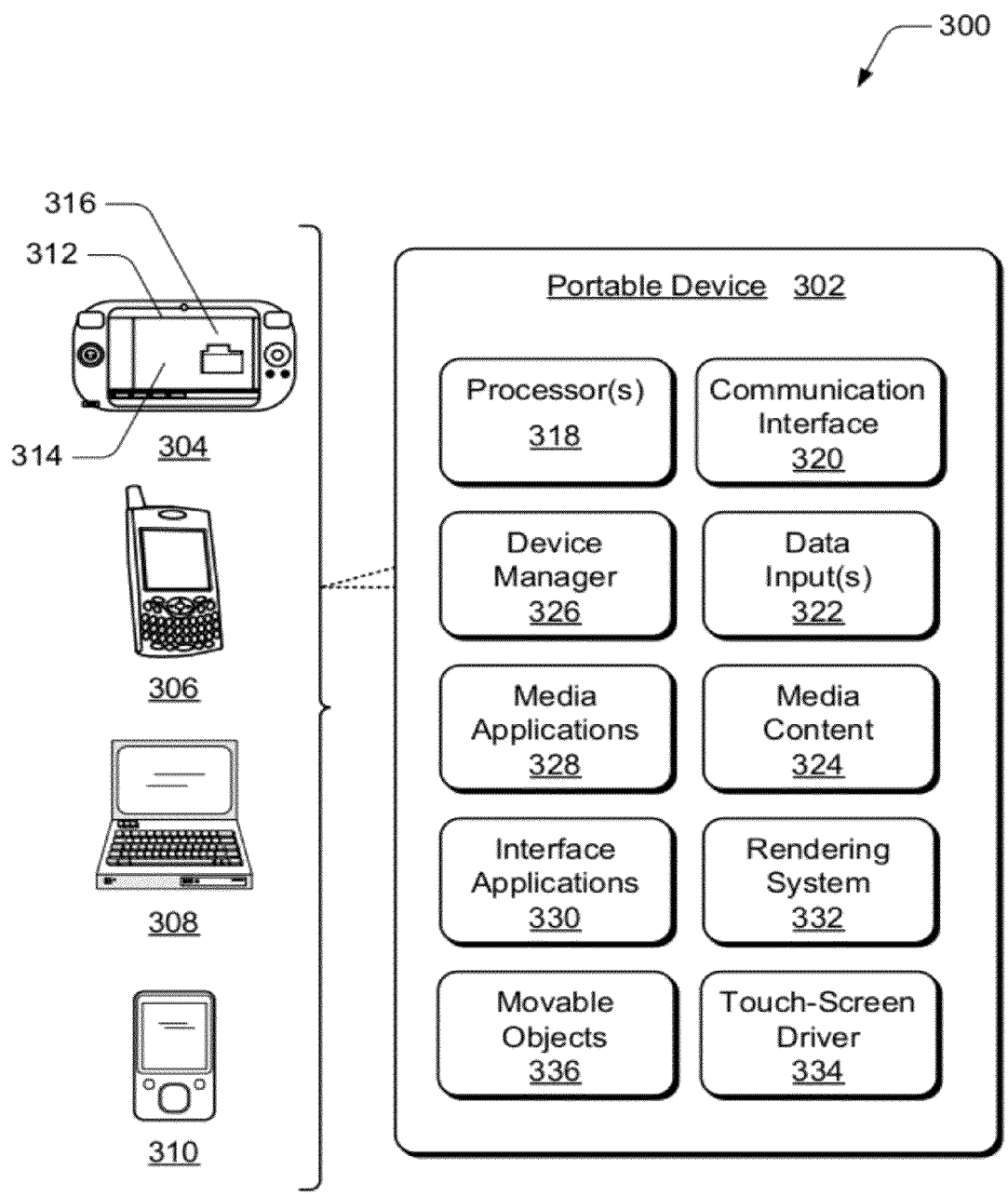
FIG. 3 illustrates an example system in which embodiments of drop target gestures can be implemented.

FIG. 3 illustrates an example system 300 in which various embodiments of drop target gestures can be implemented. Example system 300 includes a portable device 302 (e.g., a wired and/or wireless device) that can be any one or combination of a mobile personal computer 304, a personal digital assistant (PDA), a mobile phone 306 (e.g., cellular, VoIP, WiFi, etc.) that is implemented for data, messaging, and/or voice communications, a portable computer device 308 (e.g., a laptop computer, a laptop computer with a touch-screen, etc.), a media device 310 (e.g., a personal media player, portable media player, etc.), a gaming device, an appliance device, an electronic device, and/or any other type of portable device that can receive, display, and/or communicate data in any form of audio, video, and/or image data.

Each of the various portable devices can include an integrated display and/or an integrated touch-screen, as well as selectable input controls via which a user can input data and/or selections. For example, mobile personal computer 304 includes an integrated touch-screen 312 on which a user interface 314 can be displayed that includes displayable objects and/or user interface elements 316, such as any type of image, graphic, text, selectable button, user-selectable control, menu selection, map element, and/or any other type of user interface displayable feature or item.

Any of the various portable devices described herein can be implemented with one or more sensors, processors, communication components, data inputs, memory components, storage media, processing and control circuits, and/or a content rendering system. Any of the portable devices can also be implemented for communication via communication networks that can include any type of a data network, voice network, broadcast network, an IP-based network, and/or a wireless network that facilitates data, messaging, and/or voice communications. A portable device can also be implemented with any number and combination of differing components as described with reference to the example device shown in FIG. 5. A portable device may also be associated with a user (i.e., a person) and/or an entity that operates the device such that a portable device describes logical devices that include users, software, and/or a combination of devices.

In this example, portable device 302 includes one or more processors 318 (e.g., any of microprocessors, controllers, and the like), a communication interface 320 for data, messaging, and/or voice communications, and data inputs 322 to receive media content 324. Media content (e.g., to include recorded media content) can include any type of audio, video, and/or image data received from any media content or data source, such as messages, television media content, music, video clips, data feeds, interactive games, network-based applications, and any other content. Portable device 302 is implemented with a device manager 326 that includes any one or combination of a control application, software application, signal processing and control module, code that is native to the particular device, and/or a hardware abstraction layer for the particular device.

Portable device 302 includes various media applications 328 that may incorporate components such as interface applications 330 that can be processed or otherwise executed by the processors 318. The media applications 328 can include a music and/or video player, a Web browser, an email application, and the like. Portable device 302 includes a rendering system 332 to render user interfaces from the interface applications 330 to generate a display on any of the portable devices. The rendering system 332 is also implemented to receive and render any form of audio, video, and/or image data received from any media content and/or data source.

Portable device 302 also includes a touch-screen driver 334 and movable objects 336 that are registered with an interface application 330 as described with reference to objects that are configured for selection to move and display at a target position. Implementations of an interface application 330 and the touch-screen driver 334 are described with reference to the interface application 108 and touch-screen driver 106 shown in FIGS. 1 and 2, and with reference to embodiments of drop target gestures as described herein.

Example methods 400, 500, and 600 are described with reference to respective FIGS. 4, 5, and 6 in accordance with one or more embodiments of drop target gestures. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. The example methods may be described in the general context of computer-executable instructions, which can include software, applications, routines, programs, objects, components, data structures, procedures, modules, functions, and the like.

The methods may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 4:
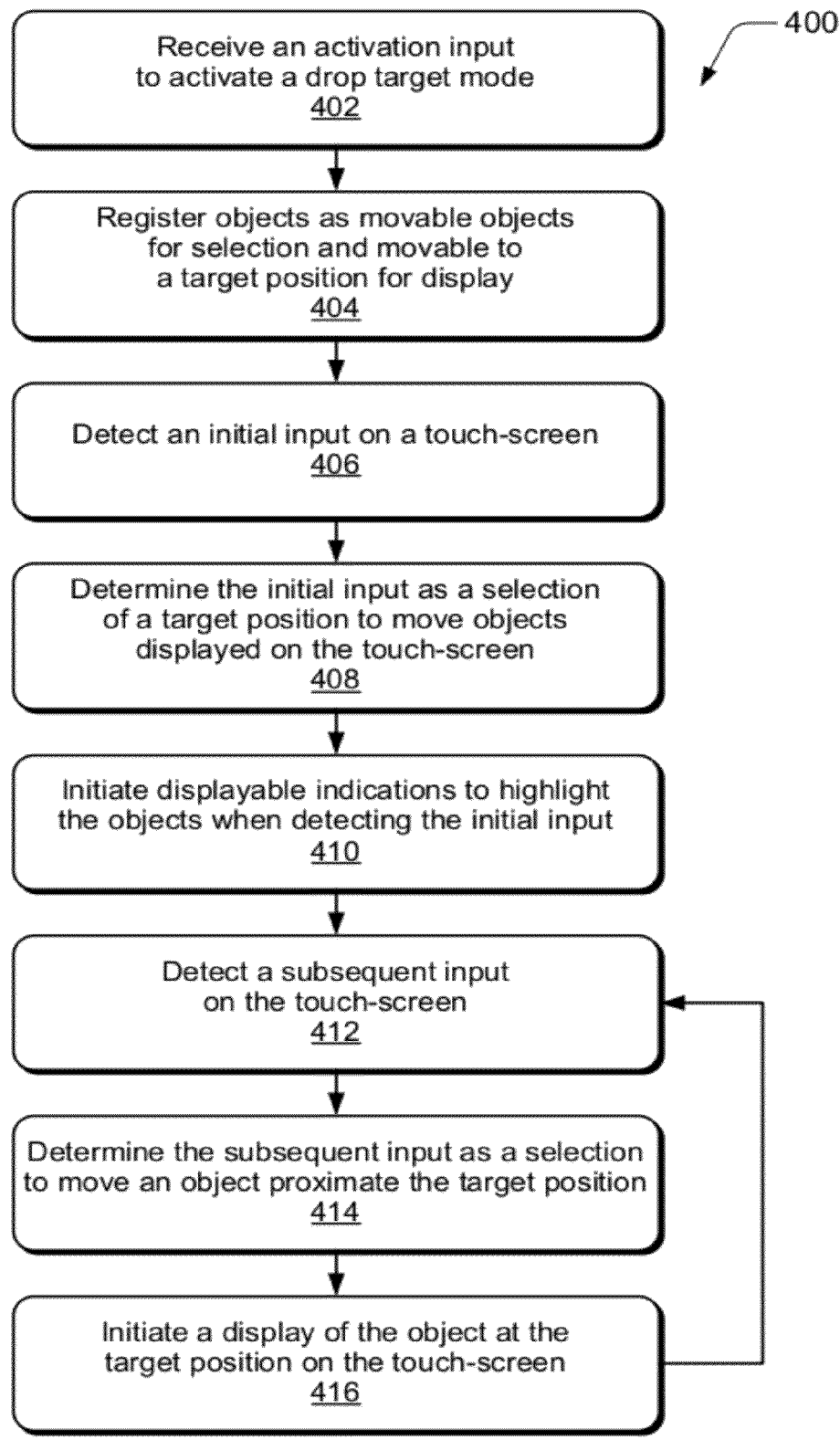
FIG. 4 illustrates example method(s) for drop target gestures in accordance with one or more embodiments.

FIG. 4 illustrates example method(s) 400 of drop target gestures. The order in which the method is described is not intended to be construed as a limitation, and any number of the described method blocks can be combined in any order to implement the method, or an alternate method.

At block 402, an activation input is received to activate a drop target mode. For example, portable device 102 can include a user-selectable control (e.g., hardware or software) to initiate a drop target mode, such as drop target anchoring. At block 404, objects are registered as movable objects that are configured for selection and can be moved to a target position for display. For example, objects that are displayed in a user interface on a touch-screen can be registered with the interface application 108 as movable objects that are configured for selection and can be moved to a target position for display.

At block 406, an initial input on a touch-screen is detected and, at block 408, the initial input is determined as a selection of a target position to move objects displayed on the touch-screen. For example, the touch-screen driver 106 at portable device 102 detects the initial input 208 on touch-screen 104, and the interface application 108 determines that the initial input 208 is a selection of the target position 202 to move the objects 204 displayed on the touch-screen.

At block 410, displayable indications are initiated to highlight the objects when detecting the initial input on the touch-screen. For example, the interface application 108 at portable device 102 initiates a displayable indication to highlight the objects 204 when the initial input 208 on the touch-screen is detected at the target position 202. A displayable indication can be any type of highlight, color, image, and/or graphic to illustrate possible objects 204 (e.g., objects that are registered as movable objects) that can be moved to the target position 202.

At block 412, a subsequent input on the touch-screen is detected and, at block 414, the subsequent input is determined as a selection to move an object proximate the target position. For example, the touch-screen driver 106 at portable device 102 detects subsequent inputs on the touch-screen 104 that are determined by the interface application 108 as object selections to move the objects 204 proximate the target position 202. In an implementation, the subsequent inputs are detected while the initial input 208 remains in contact with the touch-screen, as detected by the touch-screen driver 106.

At block 416, a display of the object at the target position is initiated on the touch-screen. For example, the interface application 108 at portable device 102 initiates a display of the objects 204 at the target position 202 on the touch-screen, thus giving the appearance that the objects move from each respective location to the target position 202. The method then continues at blocks 412-416 to detect subsequent inputs on the touch-screen, determine each subsequent input as a selection to move another object proximate the target position, and initiate a display of the object at the target position on the touch-screen. For example, the touch-screen driver 106 detects a touch input 210 to move object 212 proximate the target position 202, and then detects a subsequent touch input 214 to move object 216 proximate the target position 202.

Figure 5:
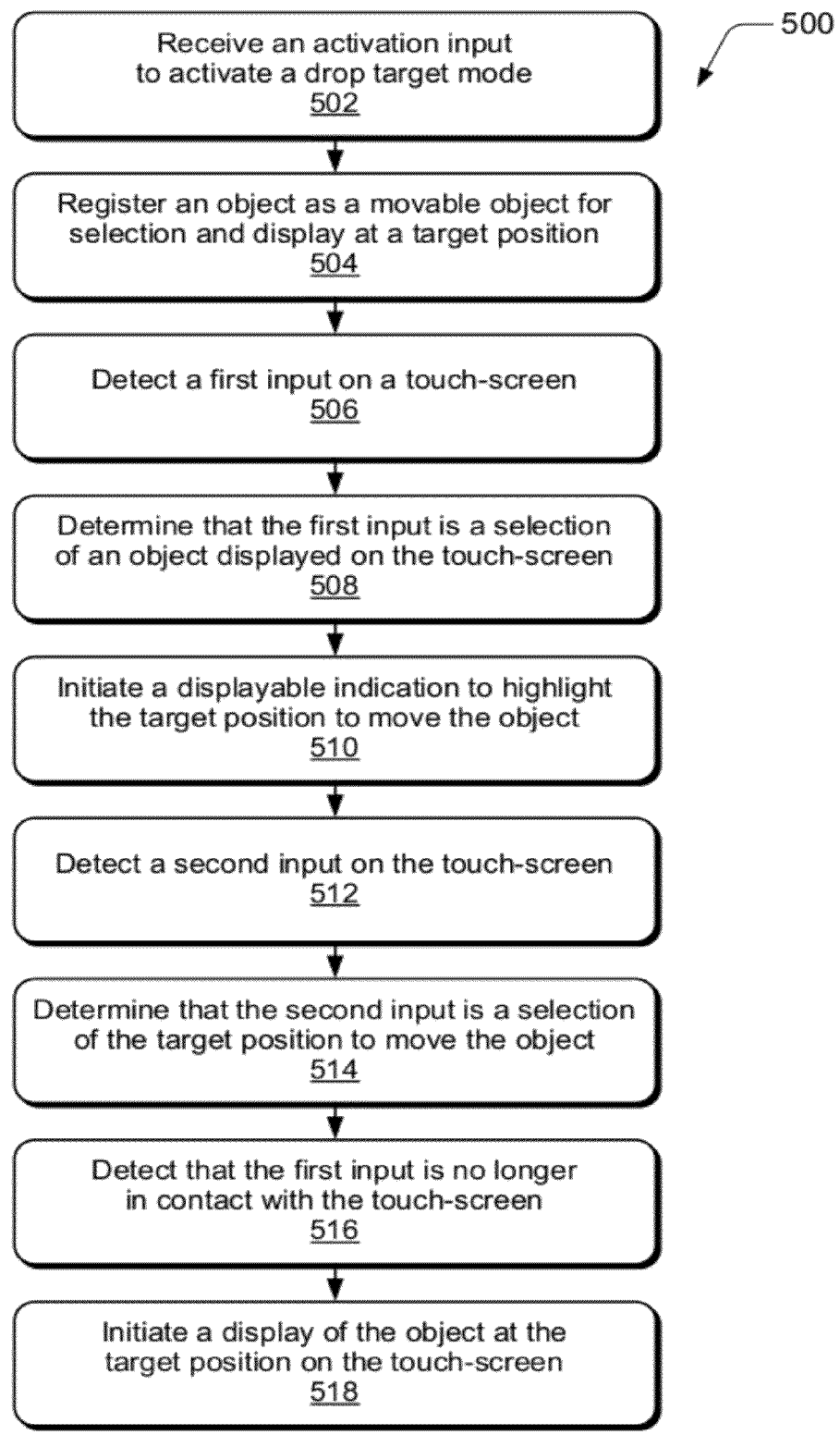
FIG. 5 illustrates example method(s) for drop target gestures in accordance with one or more embodiments.

FIG. 5 illustrates example method(s) 500 of drop target gestures. The order in which the method is described is not intended to be construed as a limitation, and any number of the described method blocks can be combined in any order to implement the method, or an alternate method.

At block 502, an activation input is received to activate a drop target mode. For example, the portable device 102 can include a user-selectable control (e.g., hardware or software) to initiate a drop target mode, such as a press-n-drop mode. At block 504, an object is registered as a movable object that is configured for selection and display at a target position. For example, objects that are displayed in a user interface on a touch-screen can be registered with the interface application 108 as movable objects that are configured for selection and can be moved to a target position for display.

At block 506, a first input on a touch-screen is detected and, at block 508, the first input is determined as a selection of an object displayed on the touch-screen. For example, the touch-screen driver 106 at portable device 102 detects the first input 116 on the touch-screen 104, and the interface application 108 determines that the first input 116 is a selection of the object 112 that is displayed on the touch-screen.

At block 510, a displayable indication is initiated to highlight the target position or positions to move the object. Note that once the movable object is selected, multiple drop targets may be displayed or highlighted on the touch-screen. In an implementation, the displayable indication can be initiated for display when the first input on the touch-screen is detected. For example, the touch-screen driver 106 at portable device 102 detects the first input 116 on the touch-screen 104, and the interface application 108 initiates a displayable indication 120 to highlight the target position 114 when the first input 116 on the touch-screen is detected.

At block 512, a second input on the touch-screen is detected and, at block 514, the second input is determined as a selection of a target position to move the object. For example, the touch-screen driver 106 detects the second input 118 on the touch-screen 104 that is determined by the interface application 108 as a selection of the target position 114 to move the object. The second input 118 is detected while the first input 116 remains in contact with the touch-screen.

At block 516, the first input is detected as no longer being in contact with the touch-screen. For example, the touch-screen driver 106 detects when the first input 116 is no longer in contact with the touch-screen. At block 518, a display of the object at the target position on the touch-screen is initiated. For example, the interface application 108 then initiates a display of the object 112 at the target position 114 on the touch-screen, thus giving the appearance that the object moves from a location of the first input 116 to the second input 118 which is at or proximate the target position 114.

Figure 6:
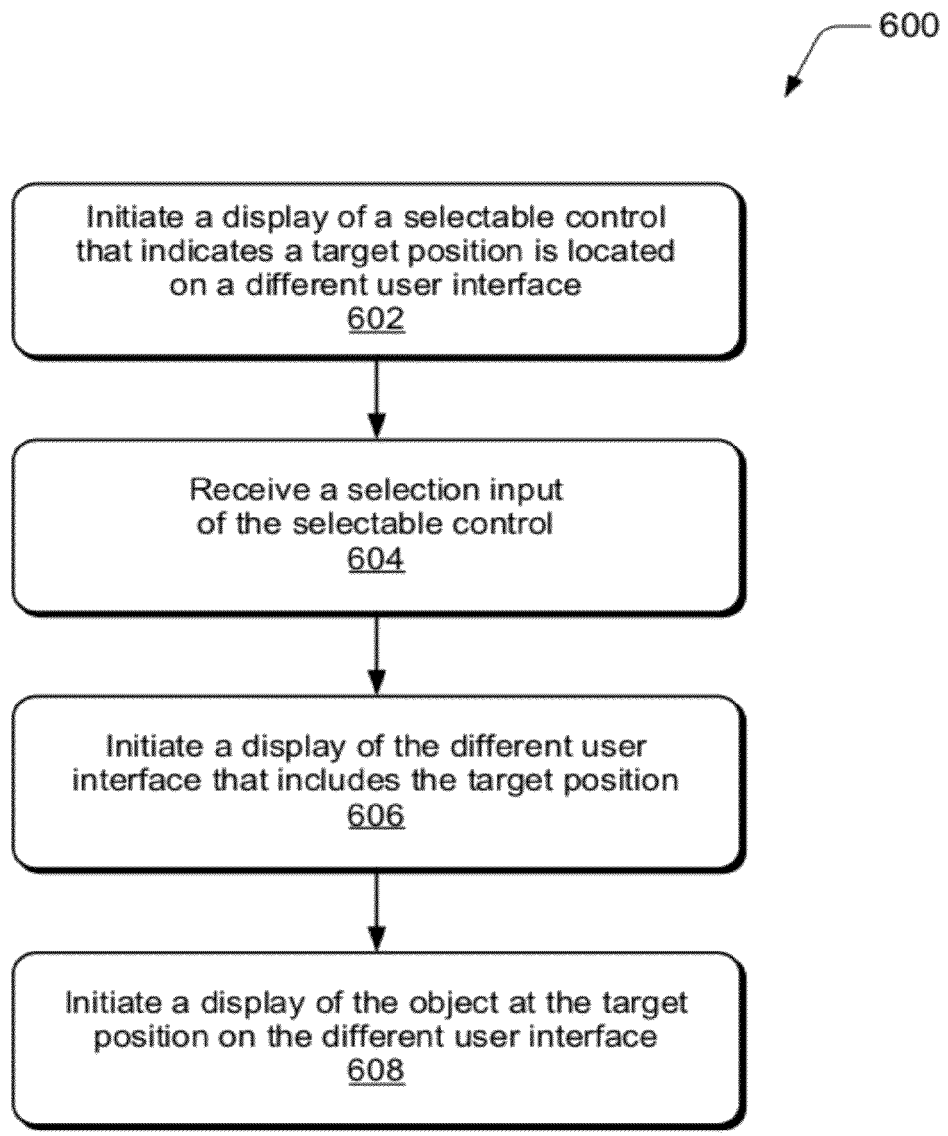
FIG. 6 illustrates example method(s) for drop target gestures in accordance with one or more embodiments.

FIG. 6 illustrates example method(s) 600 of drop target gestures. The order in which the method is described is not intended to be construed as a limitation, and any number of the described method blocks can be combined in any order to implement the method, or an alternate method.

At block 602, a display of a selectable control is initiated that indicates a target position is located on a different user interface (i.e., a different user interface than the current user interface on which the object is displayed). For example, the touch-screen driver 106 at portable device 102 detects the first input 116 on the touch-screen 104, and the interface application 108 initiates a display of the selectable control 122 that indicates a target position for the object 112 is located on a different user interface than the current user interface 110 on which the object is displayed.

At block 604, a selection input of the selectable control is received and, at block 606, a display of the different user interface that includes the target position is initiated. For example, the touch-screen driver 106 detects a selection input of the selectable control 122, such as a user touch or similar tap input, and the interface application 108 initiates a display of the different user interface 124 on the touch-screen. The different user interface 124 (i.e., different than user interface 110) includes the target position 126 where object 112 can be moved for display.

At block 608, a display of the object is initiated at the target position on the different user interface. For example, the interface application 108 at portable device 102 initiates the object 112 being displayed at the target position 126 to give the appearance of having moved from the location of the first touch input 116 on user interface 110 to the target position at the second touch input 128 on user interface 124.

Figure 7:
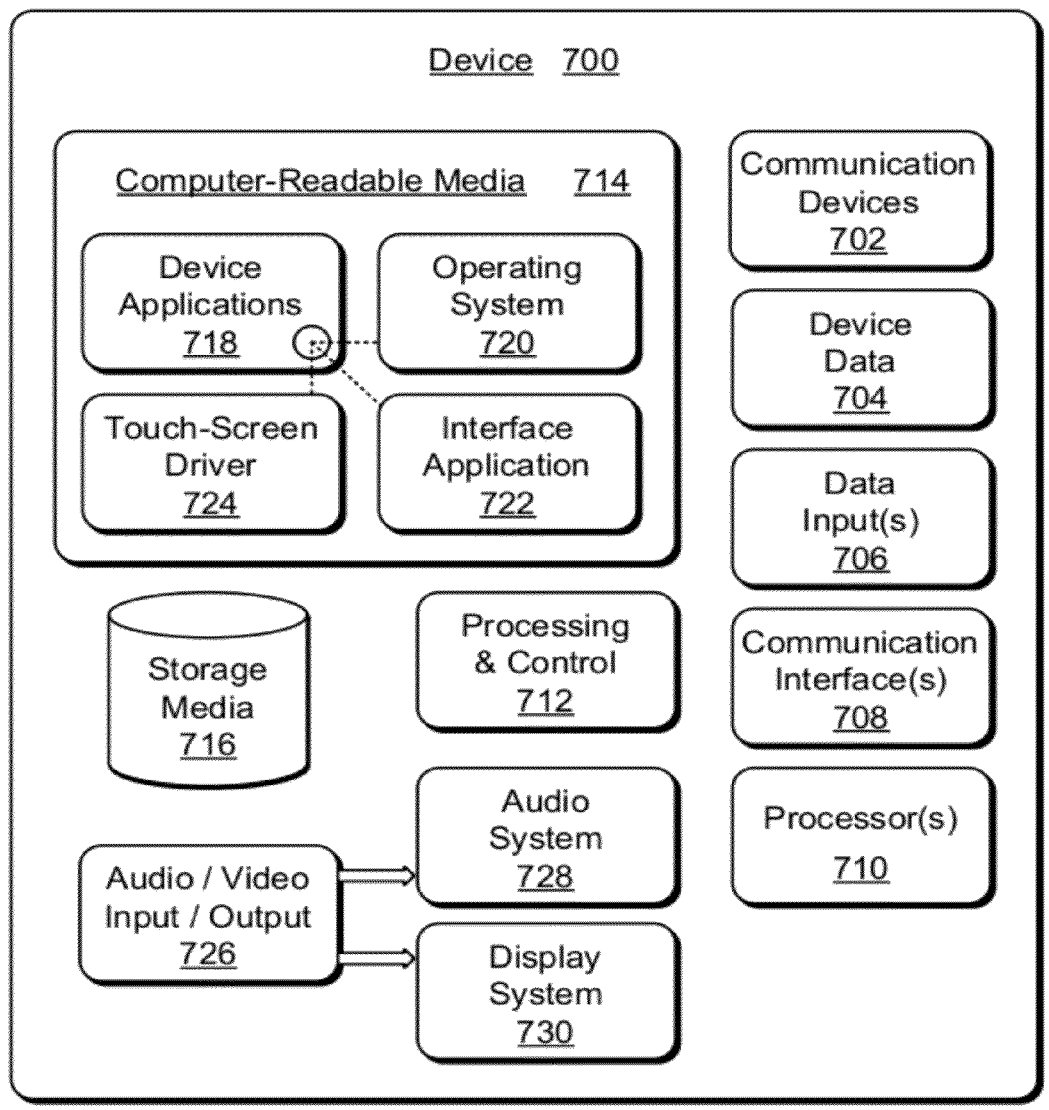
FIG. 7 illustrates various components of an example device that can implement embodiments of drop target gestures.

FIG. 7 illustrates various components of an example device 700 that can be implemented as any type of portable and/or computer device as described with reference to FIGS. 1-3 to implement embodiments of drop target gestures. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of drop target gestures. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of drop target gestures. In this example, the device applications 718 include an interface application 722 and a touch-screen driver 724 that are shown as software modules and/or computer applications. Alternatively or in addition, the interface application 722 and the touch-screen driver 724 can be implemented as hardware, software, firmware, or any combination thereof.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

Although embodiments of drop target gestures have been described in language specific to features and/or methods, it is to be understood that the subject of the appended claims is not necessarily limited to the specific features or methods described. Rather, the specific features and methods are disclosed as example implementations of drop target gestures.

The invention claimed is:

1. A method implemented by a portable computer device, the method comprising:
    detecting a first input on a touch-screen that is determined as a selection of an object displayed on the touch-screen;
    detecting a second input on the touch-screen that is determined as a selection of a target position to move the object, the second input being detected while the first input remains in contact with the touch-screen at a selection position of the first input;
    detecting that the first input is no longer in contact with the touch-screen; and
    initiating a display of the object at the target position on the touch-screen giving the appearance that the object moves from a location of the first input to the target position.

2. A method as recited in claim 1, further comprising receiving an activation input to a user-selectable control to activate a drop target mode to initiate said detecting the first input and the second input.

3. A method as recited in claim 1, further comprising detecting the first input on the touch-screen as a touch and gesture motion combination that is determined as the selection of the object.

4. A method as recited in claim 1, further comprising registering the object as a movable object that is configured for the selection and the display of the movable object at the target position.

5. A method as recited in claim 1, further comprising initiating a displayable indication to highlight the target position to move the object when said detecting the first input on the touch-screen.

6. A method as recited in claim 1, further comprising initiating a display of a selectable control that indicates the target position is located on a user interface that is different than a current user interface on which the object is displayed.

7. A method as recited in claim 6, further comprising
    receiving a selection input of the selectable control; and
    initiating a display of the user interface that includes the target position and said initiating the display of the object at the target position on the user interface when said detecting that the first input is no longer in contact with the touch-screen.

8. A method as recited in claim 1, further comprising:
    detecting subsequent inputs on the touch-screen while the second input remains in contact with the touch-screen at the target position, the subsequent inputs determined as additional selections to move additional objects proximate the target position; and
    initiating a display of the additional objects at the target position on the touch-screen giving the appearance that the additional objects move from respective locations of the subsequent inputs to the target position.

9. A method implemented by a portable computer device, the method comprising:
    detecting an initial input on a touch-screen that is determined as a selection of a target position to move objects displayed on the touch-screen;
    detecting subsequent inputs on the touch-screen while the initial input remains in contact with the touch-screen at the target position, the subsequent inputs determined as object selections to move the objects proximate the target position; and initiating a display of the objects at the target position on the touch-screen giving the appearance that the objects move from respective locations of the subsequent inputs to the target position.

10. A method as recited in claim 9, wherein the subsequent inputs are detected while the initial input remains in contact with the touch-screen.

11. A method as recited in claim 9, further comprising receiving an activation input to a user-selectable control to activate a drop target mode to initiate said detecting the initial input and the subsequent inputs.

12. A method as recited in claim 9, further comprising registering the objects as movable objects that are configured for the selection and the display of the movable objects at the target position.

13. A method as recited in claim 9, further comprising initiating displayable indications to highlight the objects when said detecting the initial input on the touch-screen.

14. A portable computer device, comprising:
at least a memory and a processor configured to implement a drop target mode to give the appearance that objects move proximate a target position if selected on a touch-screen;
a touch-screen driver configured to:
detect a first input on the touch-screen that is determined as a selection of an object displayed on the touch-screen;
detect a second input on the touch-screen that is determined as a selection of the target position to move the object, the second input configured for detection while the first input remains in contact with the touch-screen at a selection position of the first input;
detect that the first input is no longer in contact with the touch-screen; and
an interface application configured to initiate a display of the object at the target position on the touch-screen.

15. A portable computer device as recited in claim 14, wherein the touch-screen driver is further configured to detect the first input on the touch-screen as a touch and gesture motion combination that is determined as the selection of the object.

16. A portable computer device as recited in claim 14, wherein the interface application is further configured to register the one or more objects as movable objects that are configured for the selection and the display of the movable objects proximate the target position.

17. A portable computer device as recited in claim 14, wherein the interface application is further configured to initiate a displayable indication to highlight the target position to move the object when the first input on the touch-screen is detected.

18. A portable computer device as recited in claim 14, wherein the interface application is further configured to initiate a display of a selectable control that indicates the target position is located on a user interface that is different than a current user interface on which the object is displayed.

19. A portable computer device as recited in claim 18, wherein:
the touch-screen driver is further configured to detect a selection input of the selectable control; and
the interface application is further configured to initiate a display of the user interface that includes the target position and initiate the display of the object at the target position on the user interface when the first input is detected as no longer being in contact with the touch-screen.

20. A portable computer device as recited in claim 14, wherein:
the touch-screen driver is further configured to detect subsequent inputs on the touch-screen while the second input remains in contact with the touch-screen at the target position, the subsequent inputs determined as additional selections to move the objects proximate the target position; and
the interface application is further configured to initiate a display of the objects at the target position on the touch-screen.

\* \* \* \* \*